United States Patent [19]
Taylor et al.

[11] 4,400,587
[45] Aug. 23, 1983

[54] OVERFLOW AND DIVERSION TO A FOREIGN SWITCH

[75] Inventors: Michael P. Taylor; Jean R. Oliphant, both of Cedar Rapids, Iowa

[73] Assignee: Rockwell International Corporation, El Segundo, Calif.

[21] Appl. No.: 296,033

[22] Filed: Aug. 25, 1981

[51] Int. Cl.³ .............................................. H04Q 3/64
[52] U.S. Cl. ................................................. 179/27 D
[58] Field of Search ........... 179/27 D, 27 FH, 18 BE, 179/18 B, 18 EA

[56] References Cited

U.S. PATENT DOCUMENTS

| | | | |
|---|---|---|---|
| 4,048,452 | 9/1977 | Oehring et al. | 179/27 D |
| 4,145,578 | 3/1979 | Orriss | 179/27 D |
| 4,163,124 | 7/1979 | Jolissaint | 179/27 D X |
| 4,289,934 | 9/1981 | Pitroda et al. | 179/27 D |

OTHER PUBLICATIONS

"No. 1 ESS Furnishes ACD Service", by H. A. Lanty et al., *Bell Laboratories Record*, Mar. 1978, pp. 76–82.

*Primary Examiner*—Thomas W. Brown
*Attorney, Agent, or Firm*—V. Lawrence Sewell; Howard R. Greenberg; H. Fredrick Hamann

[57] ABSTRACT

A method of overflow and diversion re-routing is disclosed for use in an automatic call distributor system of the type in which an incoming call is assigned to an original gate, that is, a group of agents, but in selected circumstances the call is to be re-routed from the original gate. The ACD system is assumed to be connected to telephone network trunks and possibly one or more dedicated trunks, the method of the present invention has the capability of re-routing excess calls to other destinations, including other switches accessible only by the telephone network trunks. The method includes sending a dialed network number on the telephone network trunks, preferably after making sure that there is a trunk suitable for said destination, which is idle. If there is not one available, even for an alternate re-route destination, then the call is entered in a queue for access to the originally assigned gate.

8 Claims, 8 Drawing Figures

OVERFLOW AND DIVERSION TO A FOREIGN SWITCH

BACKGROUND OF THE INVENTION

This invention relates to automatic call distributor systems, and in particular to a method of re-routing an incoming call from a gate or group of agents to which the call is originally assigned.

Overflow and diversion services are important features of automatic call distributor systems. Overflow is particularly useful to re-route incoming calls which would ordinarily go to one "gate" or group of agents, when this gate becomes too busy. This type of operation is described, for example, in U.S. Pat. No. 4,048,452 to Oehring et al. The method used in the latter patent is to overflow calls, when the oldest call in queue to be serviced by a particular gate has been there longer than a pre-selected period. Diversion is useful, for example, when a gate is out of service, for example, during hours when agents are off duty.

It is often useful to re-route calls by overflow or diversion to an associated automatic all distributor system. Various methods have been employed to accomplish this, sometimes using special signalling between the two systems and generally employing dedicated trunks between the two systems or other special trunking arrangements. A problem arises when a user has two automatic call distributor systems of different manufacturers, which do not use the same inter-system signalling. Another problem occurs when there is no direct connection between the two systems; they can only communicate by means of a telephone network using telephone codes. The method of the present invention deals with these problems.

SUMMARY OF THE INVENTION

In the method of the present invention, a call can be re-routed through a telephone network trunk, with the automatic call distributor system dialing the destination by a network number, thus permitting re-routing to any destination on the telephone network.

An important feature of the present method is that before the network number of the re-route destination is dialed, each of the trunks suitable for routing from the automatic call distributor to the destination are checked to see if any are available or idle. If one is idle, then the re-route call is dialed and when the connection between the automatic call distributor and the destination is completed through the trunk, then the call incoming to the automatic call distributor is connected to the trunk. If no trunk is idle, even after checking trunks to alternate re-route destination, then the incoming call is entered into a queue for access to the agent gate originally assigned to the call.

The method of the invention deals directly with the problems of prior practices mentioned above. First, an automatic call distributor system of one manufacturer can re-route calls to a second automatic call distributor of another manufacturer, by placing an incoming call to the second system. Second, two automatic call distributors which have no direct connection between them can re-route to each other by means of the telephone network.

One of the advantages of the system is that it can re-route to practically any kind of destination. As will be disclosed below, it can re-route to destinations internal to the automatic call distributor, namely other agent gates and extensions of the distributor system. It can also re-route through a dedicated trunk. Beyond this, however, it can re-route to another call distributor or other switch on a telephone network trunk or any subscriber station accessible through the telephone network.

It is undesirable for the user who has placed the incoming call to be re-routed and then to receive a busy signal. The probability of this happening is not eliminated by the method of the present invention, but it is diminished. The system checks its own trunks to make sure that one is available for the outgoing call before dialing the call. This eliminates the situation in which the person placing the incoming call gets a busy signal due to there being no trunk available outgoing from the automatic call distributor.

These and other features and advantages will be best understood from a detailed description of a preferred embodiment, as described below in connection with the following drawings.

DESCRIPTION OF PREFERRED EMBODIMENT

Figure 1:
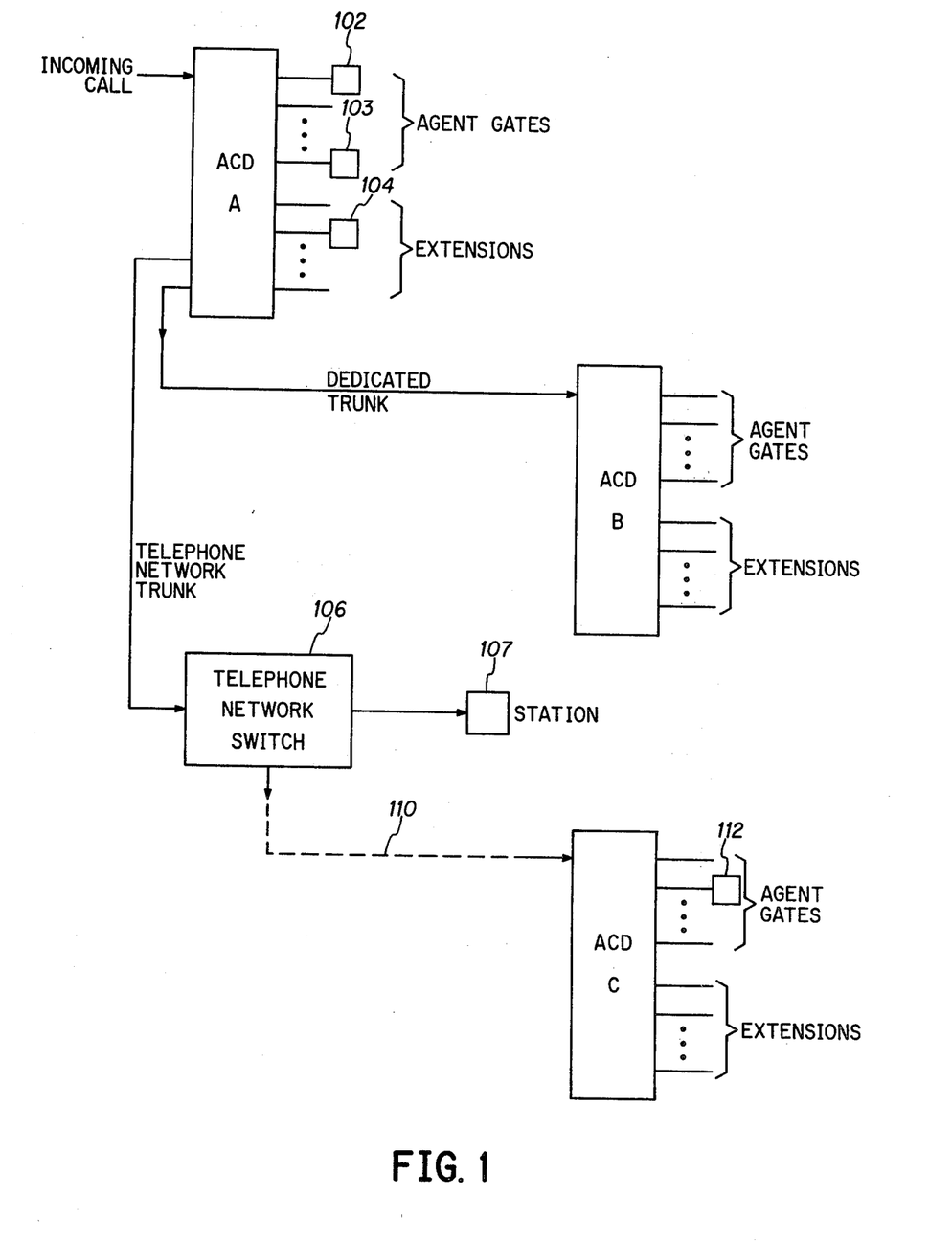
FIG. 1 is a block diagram illustrating possible re-route destinations for an automatic call distributor system.

FIG. 1 shows the type of re-routing which is to be accomplished in accordance with the invention. The automatic call distributor which is doing the re-routing is the one designated "ACD A" ACD A is shown to have multiple gates. Each gate has a group of agents, who can service the calls coming to that gate, as time permits. If, for example, the agents of a particular gate or the system as a whole are off duty, then calls coming to the gates with the off duty agents can be unconditionally re-routed to another destination for service. This unconditional re-routing is called "diversion". On the other hand, the process of "overflow" may be used to re-route incoming calls from a gate which has become too busy. For example, if there are too many calls queued up to be serviced by a gate, or if the oldest call in the queue is too old, it can be desirable to overflow the calls.

In the past, it has been known to re-route calls from one gate such as gate 102 of FIG. 1 to another gate such as 103. Alternatively, the calls coming to gate 102 can be re-routed to an extension 104, which may be, for example, a night number. It is also known to re-route to another system such as ACD B by means of a dedicated trunk.

By the method of the present invention, it is possible to re-route to additional destinations. Re-routing can take place through a telephone network trunk to another switch 106 and thereby reach any of the subscriber stations 107 serviced by the switch. ACD A can reach the switch 106 by an On-Net connection. In addition, however, it can make the Off-Net connection to ACD C through switch 106 and whatever telephone network connection 110 lies in between. Thus, it is possible, for example, to re-route a call from gate 102 of ACD A in one time zone, through the telephone network to a gate 112 of a less busy ACD C in another time zone.

Figure 2:
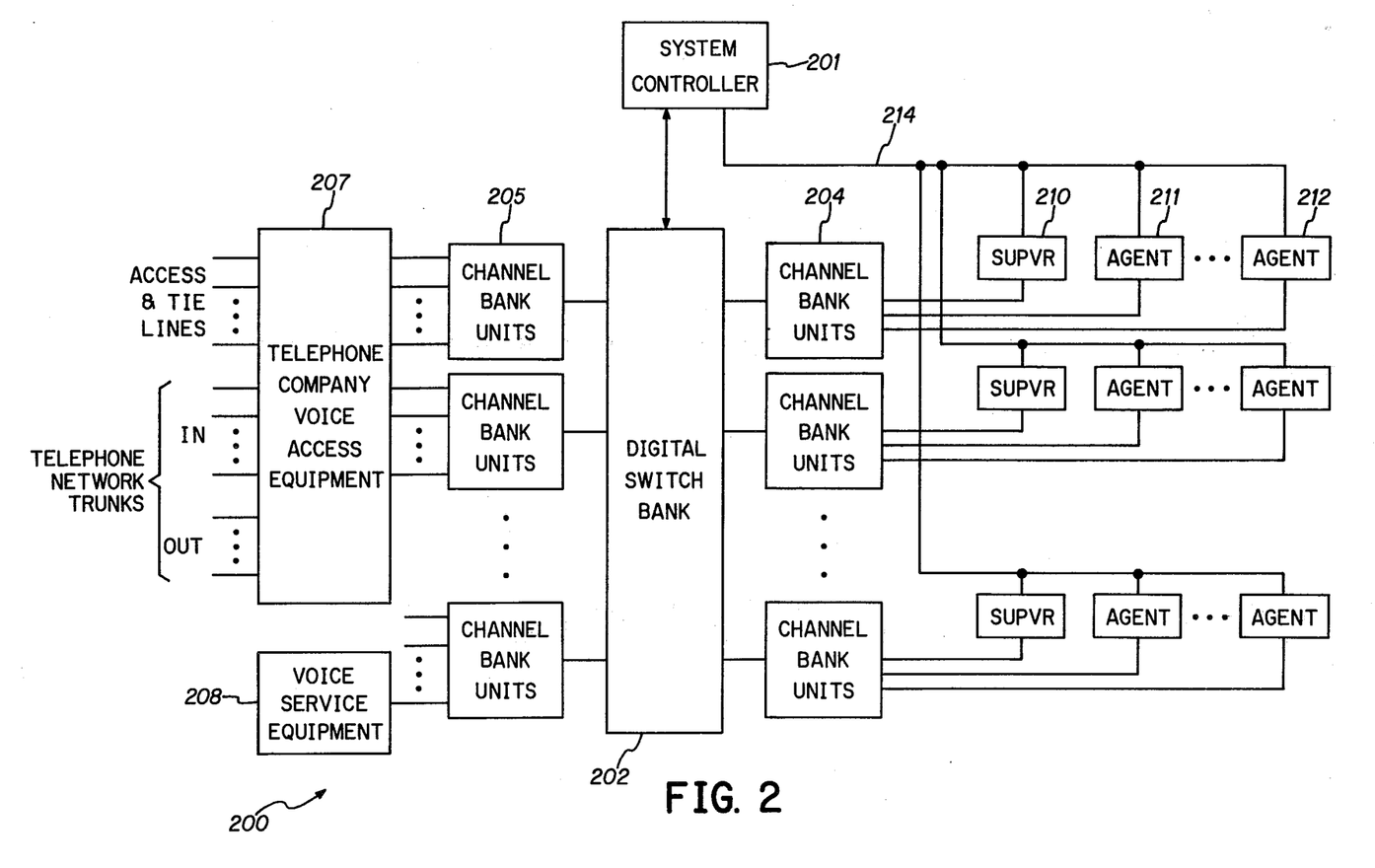
FIG. 2 is a block diagram of an automatic call distributor system appropriate for implementing the method of the invention.

FIG. 2 shows an automatic call distributor system 200 of the kind on which the method of the present invention can be practiced. The method has actually been implemented on a Rockwell International Corporation Collins Galaxy Automatic Call Distributor. However, the method can be used on other computer-controlled, switching network-based systems, such as the one described in the patent to Oehring et al referenced above. At the left side of FIG. 2 is shown telephone company voice access equipment 207, with incoming and outgoing trunks. These includes the telephone network trunks and may also include dedicated trunks such as access and tie lines. Access equipment 207 and voice service equipment 208 are connected to the main digital switch bank 202 of the system by channel bank units such as unit 205.

Switch bank 202 is preferably a digital switching network controlled by a system controller computer 201. The switch bank 202 is interconnected with the agent gates by channel bank units such as units 204. Each of the gates is comprised of a supervisor and multiple agents; supervisor station 210 and agents 211-212 form a gate. The agent and supervisor consoles communicate through control lines 214 with the system controller 201.

Figure 3:
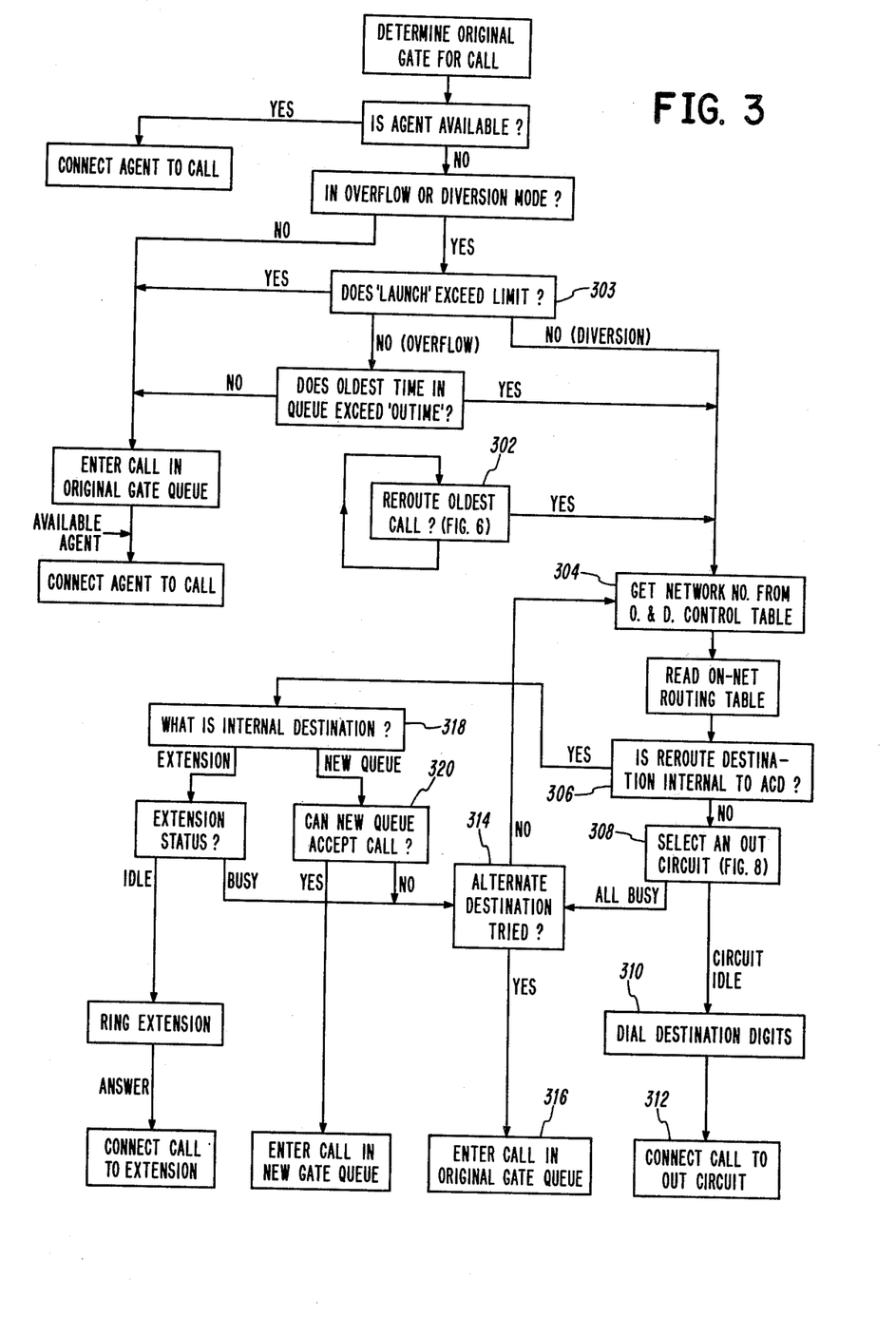
FIG. 3 is a flow chart of steps to be executed by a system controller in the automatic call distributor system of FIG. 2 to practice the method of the invention.

FIG. 3 illustrates the steps for executing overflow and diversion switching in accordance with the invention. System controller computer 201 of FIG. 2 is programmed to carry out the steps to be described below. The controller computer receives information from other elements of system 200, as will be described, and effectuates its decisions by its control of these elements, mainly digital switch bank 202.

Figure 4:
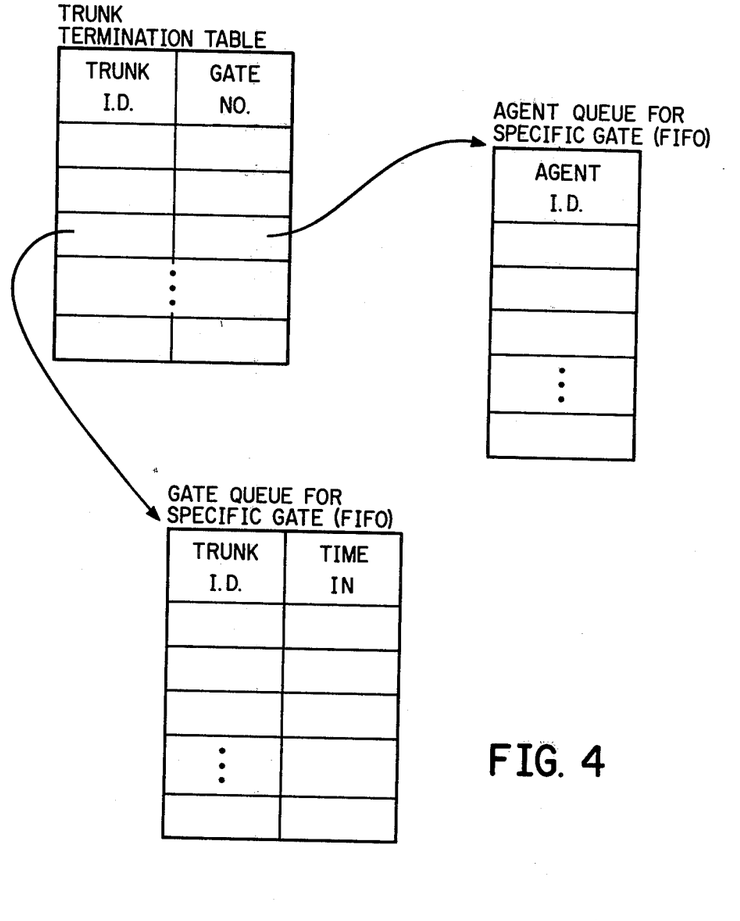
FIG. 4 is a diagram of tables and queues employed by the method illustrated in FIG. 3.

When a new call comes in to system 200 on one of its trunks, the first step, after recognizing the incoming call, is for the controller to determine the gate to which the call is assigned. The controller polls the digital switch bank 202 to determine which trunk the call is on; then it consults a Trunk Termination Table. This table, as illustrated in FIG. 4, lists the gate numbers which correspond to the various trunk identifiers. The gates are assigned to the trunks to meet the particular operating conditions of the system, and multiple trunks are typically assigned to each gate, since each gate typically has multiple agents.

As seen in FIG. 3, the next determination which must be made is whether there is an agent available for the specific gate assigned to the new incoming call. To make this determination, the controller uses the gate number derived from the Trunk Termination Table to consult an Agent Queue for that specific gate. The Agent Queue is a first-in, first-out table of the available agents for a particular gate. As an agent finishes handling a transaction, the agent presses a button such as a REL or AVI button at the agent console, indicating availability to handle a new call. As the controller polls the agent stations, it detects the available condition and stores the identifier of the agent in the Agent Queue.

If there is an agent available for the specific gate, the agent's identifier is removed from the Agent Queue, and the incoming call is connected to the agent. The trunk identifier and agent identifier are "level/line numbers". The "level" portion of the number indicates which of the channel bank units such as units 204 and 205 of FIG. 2 are handling the particular party identified. The "line" portion of the number indicates a particular circuit card within the channel bank unit. Since the system controller 201 has the level/line numbers for the incoming call trunk and for the agent, it can straightforwardly command switch bank 202 to make the connection between the two parties.

Figure 5:
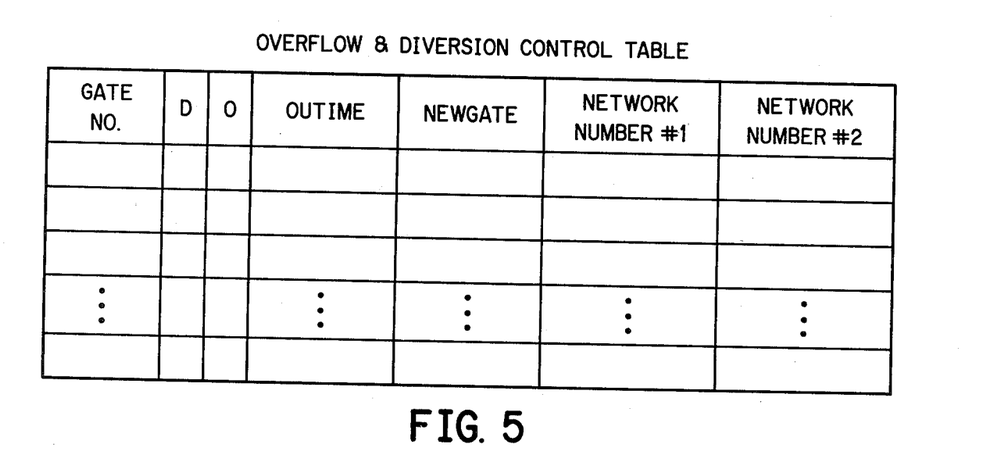
FIG. 5 is an illustration of an overflow and diversion control table required in the method of FIG. 3.

If no agent is available, the next step is to determine whether the specific gate concerned is operating in the overflow or diversion mode. This is determined from the Overflow and Diversion Control Table of FIG. 5. This table lists for each of the gates, one bit for overflow and one bit for diversion, each of which indicates whether that particular service is active. In addition, for each of the gates there are listed an overflow-out control time, "OUTIME", and overflow-in control time, "NEWGATE", a first network number and a second network number.

Initially, the controller examines the bits which indicate whether overflow or diversion is active. If neither overflow nor diversion is active, then the call is entered into a queue for the specific gate that it was originally assigned to. The first-in, first-out gate queue is illustrated in FIG. 4. Listed in the queue, along with the trunk identifier of the call, is the time at which the call is entered.

If the particular gate is found to be in either the overflow or diversion mode, then the next step is to determine whether the recent rate of overflows and diversions will permit a further overflow or diversion. The controller keeps a count, represented herein by a variable LAUNCH of the calls overflowed or diverted. In connection with a periodic task to be described below, LAUNCH is set equal to zero periodically; for example, each second. If LAUNCH is greater than a preselected, system limit, then no overflow or diversion is permitted at this time. The purposes of this constraint are to keep from overloading a system receiving the overflowed or diverted calls and to prevent the present system from becoming tied up with excessive trunk activity. If LAUNCH exceeds the system limit, then the call is entered in the original gate queue.

If the variable LAUNCH does not exceed the system limit and the gate is operating in the diversion mode, then the next step is to begin the re-routing procedure.

If the gate is operating in the overflow mode, and LAUNCH does not exceed the system limit, then the controller checks the gate queue and determines how long the oldest call has been in the queue. If the oldest call has been in the queue longer than OUTIME, then the re-route procedure begins. If not, then the call is entered in its assigned gate queue.

Once a call is in its gate queue, one way that it can be removed is if an agent becomes available. Each time an agent becomes available, the controller checks the gate queue and if there are calls waiting, removes the call from the gate queue and connects the agent to the call.

Figure 6:
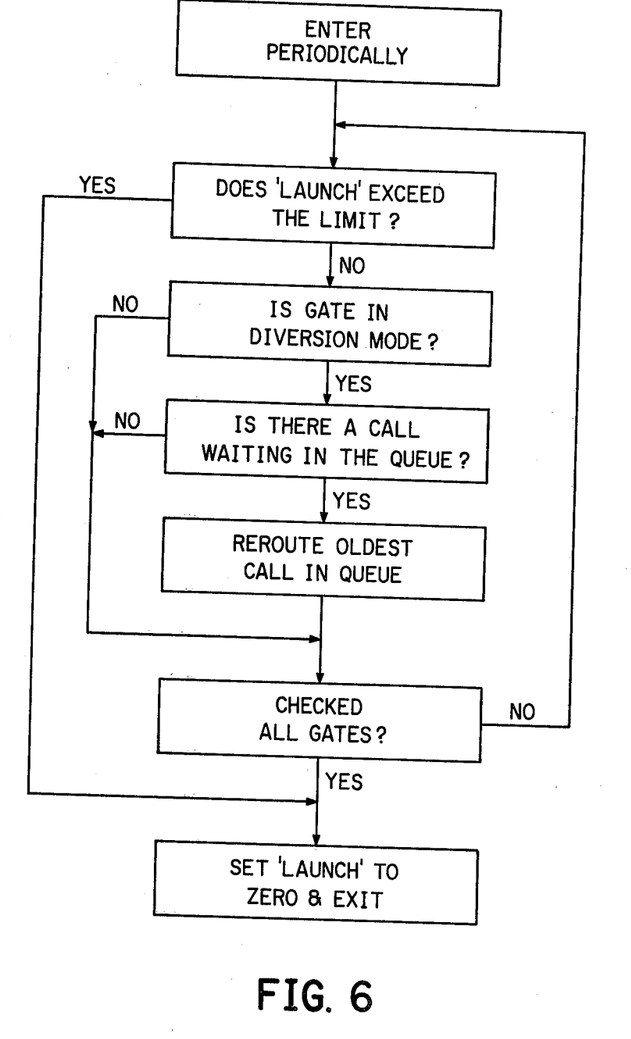
FIG. 6 is a flow chart of details of the step of periodically deciding whether to re-route the oldest call in FIG. 3.

Another way in which a call may leave the gate queue is by means of the loop 302 of FIG. 3, which periodically decides whether to re-route the oldest call. Details of this process are illustrated in FIG. 6. The routine is entered periodically, for example, once per second, and some of the same decisions are made as are made in FIG. 3. If LAUNCH does not exceed the system limit and a gate is operating in the diversion mode, with a call waiting in the gate queue, the oldest call in the queue is re-routed. The process is repeated for all the gates or until LAUNCH exceeds its limit. Before leaving the routine, LAUNCH is set to zero, so that it keeps a count of the number of re-routes which have occurred in the cycle period, for example, in one second.

Figure 7:
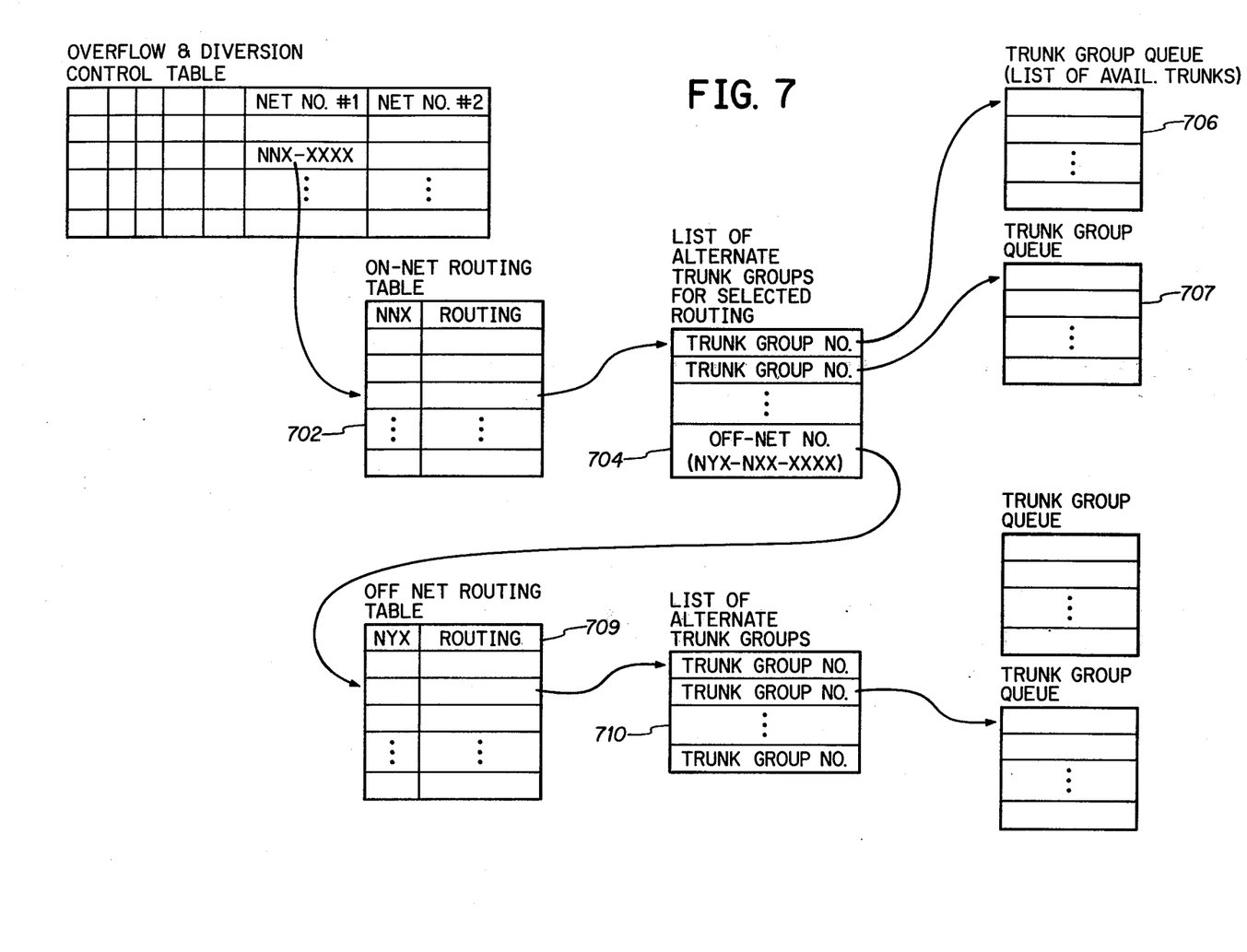
FIG. 7 is an illustration of tables, lists, and queues used in the step of selecting an out circuit in FIG. 3.

The process of re-routing a call begins, in FIG. 3, with step 304, reading the network number from the Overflow and Diversion Control Table. As illustrated in FIG. 7, this table contains a first choice Network Number #1 and an alternate Network Number #2. Each of these numbers is preferably a seven digit number.

Referring both to FIG. 3 and FIG. 7, it can be seen that the first step in making use of the Network Numbers is to use the first three digits of Network Number #1 to index in an On-Net Routing Table 702. Some of the entries in the routing portion of Table 702 point to lists, such as list 704, of trunk group numbers associated with the particular routing. Others of the routing entries in Table 702 will indicate that the re-routing destination is internal to the ACD itself. The branching of steps for external calls and internal calls is indicated at decision 306 of FIG. 3.

Figure 8:
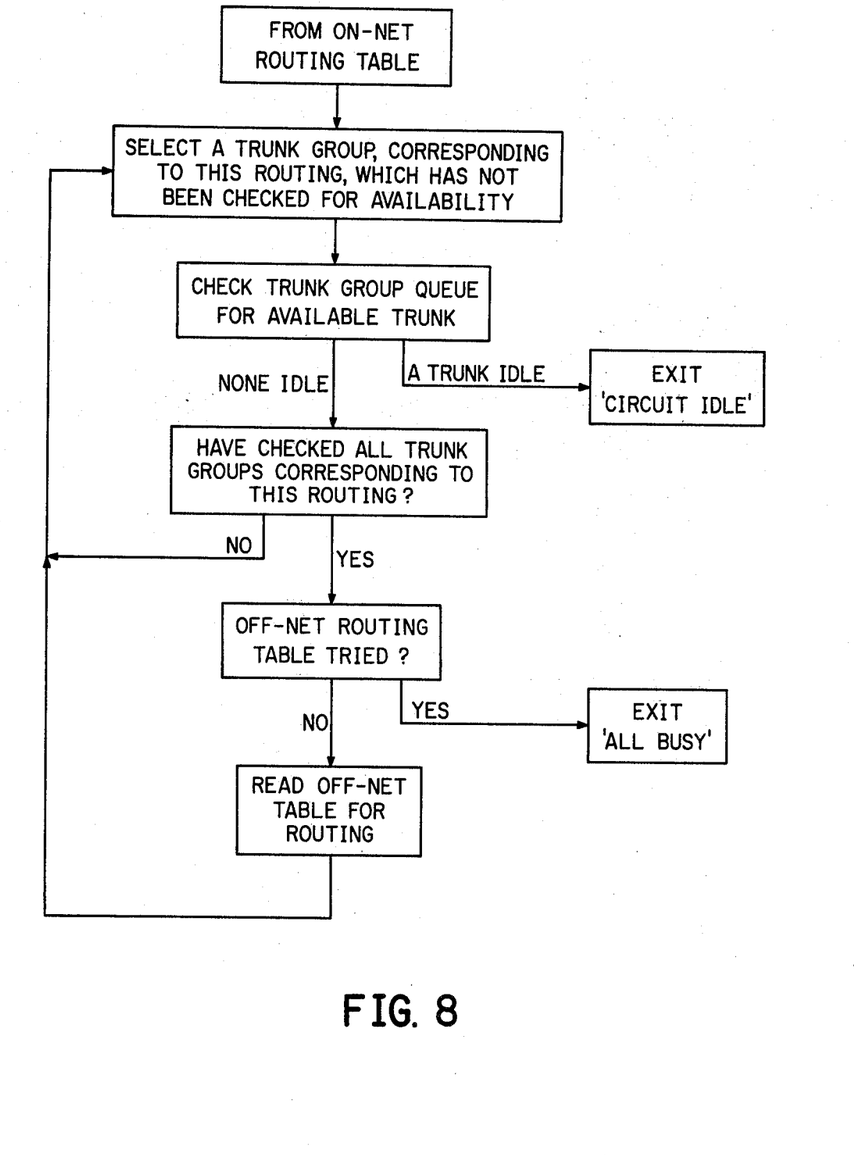
FIG. 8 is a flow chart of the details of the step of selecting an out circuit in FIG. 3.

Assuming the call is an external call, the controller goes to the list 704 of alternate trunk groups for the selected routing and checks, for the first trunk group in the list, a trunk group queue. This is a list of available trunks in the group. if there are not trunks available in the group, the controller checks the trunk group queue 707 of the next trunk group in list 704. These and other steps of the process of selecting an out circuit, indicated as step 308 of FIG. 3, are shown in flow chart form in FIG. 8. As indicated in FIG. 8 and FIG. 3, if an idle trunk is found, then the controller initiates the conventional steps of dialing destination digits and connecting the call by switch bank 202 to the out circuit. The destination digits are taken from the seven digits of the Network Number from the Overflow and Diversion Control Table. For the requirements of the decision 303 of FIG. 3, the variable LAUNCH is incremented each time a call is re-routed.

In the event that none of the trunk groups in the list 704 contains an idle trunk, the controller finally comes to the bottom item in that list, a ten digit Off-Net Number. The first three digits of this number are then used to index in an Off-Net Routing Table 709. The routing corresponding to the Off-Net number in Table 709 again leads to a list 710 of alternate trunk groups, which are checked, as were those in Table 704, to find an idle trunk.

If an idle trunk is found, then steps 310 and 312 of FIG. 3 are performed, in this case the destination digits being taken from the ten digit Off-net number obtained from list 704 of FIG. 7.

If an available trunk cannot be found through the Off-Net procedure, then, as indicated by the function 314 of FIG. 3, the re-routing process is tried again with Network Number #2 from the Overflow and Diversion Control Table. If this also does not yield an idle trunk, then the call is entered into its original assigned gate queue, as indicated by Step 316 of FIG. 3.

The trunk checking procedure of FIG. 7 represents an important feature of the invention. One approach to a re-routing procedure would simply be to look up a network number for overflow or diversion and to go directly to Step 310 of FIG. 3, dialing the network number. Then, if there were no trunk available, the caller into the ACD system 200 would simply receive a busy signal, which is undesirbale. With the trunk checking of the present system, a busy signal could still result from busy conditions in the network or at the destination, but the outgoing trunks are eliminated as a source of a busy condition. In accordance with a preferred embodiment of the present invention, the complete alternate routings such as in tables 704, 706, 707 and 710 are checked out, and if no trunks are idle, then the incoming call is saved in the original queue.

If, in the re-routing procedure, the On-Net Routing Table indicates that the destination is an internal one, then Step 318 determines whether the destination is an extension or a new gate queue. If it is an extension, then the status of the extension is checked. If the extension is idle, it is rung and, if answered, the call is connected to the extension. If the extension is busy, then the alternate destination in the Overflow and Diversion Control Table is tried according to Step 314, or the call is entered in its original gate queue.

If the call is being directed to a new gate queue, then, as indicated by Step 320, it must be determined whether the new queue can accept the call. This is begun by reading the Overflow and Diversion Control Table of FIG. 5 to get the overflow-in control time, NEWGATE. A re-routed call is not accepted into the new queue if the oldest call waiting in the new queue has been there longer than the time NEWGATE. Diversion into the new queue can be accomplished either by using a large value of NEWGATE, or by employing control bits which specify whether the gate is operating in the conditions of overflow-in or diversion-in. Typically, NEWGATE will be less than OUTIME, in an effort to route the call to a destination which can service it soon. If the overflow or diversion-in criteria is met, the call is entered in the new gate queue. If not, then at Step 314, the alternate re-route destination is tried or the call is entered in its originally assigned gate queue.

If the call is being re-routed by system 200 to another automatic call distributor system over a telephone network trunk, then the operation of the destination ACD is simple to understand. The destination system simply receives the re-routed call as if it were a new incoming call. Generally the destination ACD would be expected to enter the incoming call into a queue for one of its agent gates. It is, of course, possible that due to overflow and diversion in the destination system, the incoming call would be re-routed once more.

It should be emphasized in connection with the operation illustrated in FIG. 7 that if the network number in the Overflow and Diversion Control Table corresponds to a destination which can only be reached by off-net routing, then the system begins immediately with checking off-net routes, rather than on-net routes. As an example of how this can be accomplished in the arrangement of FIG. 7, On-Net Routing Table 702 can point to a list 704 in which the first entry is not a trunk route, but an off-net network number. This will lead, in turn, to consulting the Off-Net Routing Table 709.

From a consideration of the above description, it can be understood how the method of the present invention makes it possible to re-route to any destination which is accessible by the telephone network. It can be further understood how calls can be re-routed between systems of different manufacturers or between systems that have no direct trunk connection. Still further, it can be seen that the method of the present invention protects the calls received by system 200 to ensure that an outgoing trunk is available, before the destination digits are dialed.

We claim:

1. In an automatic call distributor system of the type wherein an incoming call is assigned to an original agent gate, and where in a selected circumstance the call is to be re-routed from the original gate, and wherein said system is connected to a plurality of trunks, which include telephone network trunks and which may in addition include one or more dedicated trunks, the method comprising the steps of:

reading from a computer memory a network number of a destination to be used in the event of re-routing from said original gate;

in response to said reading, determining whether to dial said network number over one of said trunks and, responsive to the results of said determining, optionally automatically electronically performing said dialing, including, if suitable for said destination, over one of said telephone network trunks, said determining including:

ascertaining before said dialing which of the trunks are suitable for connecting the automatic call distributor system to said destination, and checking said suitable trunks for an idle one available to connect said system to said destination, and in the event none of said trunks suitable for connecting to said destination are idle, entering an identifier of said call in a queue for access to said original gate, instead of dialing said network number; and in response to completion of a connection between the destination of said dialed number and said automatic call distributor over said one of said trunks, automatically electronically switching said incoming call to connect to said one of said trunks and thereby to said destination.

2. The method of claim 1, wherein said ascertaining and checking of trunks suitable for connecting to said destination are performed first for On-Net routing, if any is suitable, and then using an Off-Net network number, performed for trunks suitable to connect to the destination by Off-Net routing.

3. In an automatic call distributor system of the type wherein an incoming call is assigned to an original agent gate, and where in a selected circumstance the call is to be re-routed from the original gate, and wherein said system is connected to a plurality of trunks, which include telephone network trunks and which may in addition include one or more dedicated trunks, the method comprising the steps of:

reading from a computer memory a network number of a destination to be used in the event of re-routing from said original gate;

in response to said reading, determining whether to dial said network number over one of said trunks and, responsive to the results of said determining, optionally automatically electronically performing said dialing, including, if suitable for said destination, over one of said telephone network trunks, said determining including:

ascertaining before said dialing which of the trunks are suitable for connecting the automatic call distributor system to said destination, checking said suitable trunks for an idle one available to connect said system to said destination, and in the event none of said trunks suitable for connection to said destination are idle, performing said ascertaining and checking for trunks to connect to a second destination, and if none of the trunks suitable for connecting to said second destination are idle, entering an identifier of said call in a queue for access to said original gate, instead of dialing said network number.

4. The method of claim 1, further including the steps, initiated in said determining step, of ascertaining from the network number if the destination is internal to the automatic call distributor system, and if so, then if the destination is an extension, ringing said extension, and if the extension is busy, entering an identifier of said call in a queue for access to the original gate.

5. The method of claim 1, further including the steps, initiated in said determining step, of determining from the network number if the destination is internal to the automatic call distributor system, and if so, that if the destination is an extension, ringing said extension, and if the extension is busy, reading a network number of an alternate destination.

6. The method of claim 1, further including the steps, initiated in said determining step, of determining from the network number if the destination is internal to the automatic call distributor system, and if so, then if the destination is a queue for access to a different agent gate, determining whether the queue can accept the incoming call, and if not, then reading a network number of an alternate destination.

7. The method of claim 1, further including the steps, initiated in said determining step, of determining from the network number if the destination is internal to the automatic call distributor system, and if so, then if the destination is a queue for access to a different agent gate, determining whether the queue can accept the incoming call, and if not, then entering the incoming call in a queue for access to the original gate.

8. The method of claim 1, wherein a series of calls can each be re-routed by said system, the method further including the steps of keeping a count of the number of calls re-routed from said original gate, for each of a plurality of said gates for said system, and generating from said count a current rate of re-routing calls, and preventing further re-routing, while said current rate exceeds a pre-selected limit.

* * * * *